United States Patent [19]

Muller

[11] Patent Number: 4,607,738

[45] Date of Patent: Aug. 26, 1986

[54] FRICTION CLUTCH COVER ASSEMBLIES

[75] Inventor: Patrick Muller, Sevran, France

[73] Assignee: Automotive Products plc, Leamington Spa, England

[21] Appl. No.: 670,608

[22] Filed: Nov. 13, 1984

[30] Foreign Application Priority Data

Nov. 10, 1983 [FR] France ................................ 83 17971

[51] Int. Cl.⁴ .............................................. F16D 13/69
[52] U.S. Cl. ............................... 192/109 R; 192/70.18
[58] Field of Search ............. 192/70.18, 70.28, 109 R, 192/70.27

[56] References Cited

U.S. PATENT DOCUMENTS

| 3,489,256 | 1/1970 | Binder et al. | 192/70.18 X |
| 4,122,929 | 10/1978 | Maucher et al. | 192/70.18 |
| 4,423,804 | 1/1984 | Kettell et al. | 192/109 R |
| 4,540,079 | 9/1985 | Link | 192/109 R |

Primary Examiner—George H. Krizmanich
Attorney, Agent, or Firm—Solon B. Kemon

[57] ABSTRACT

A friction clutch cover assembly comprises a cover and a pressure plate connected to the cover by flexible straps. An outer flange of the cover is deformed adjacent to each flexible strap to provide a respective abutment surface which in the event of excessive pressure plate movement away from the cover each flexible strap will contact to limit said movement.

10 Claims, 5 Drawing Figures

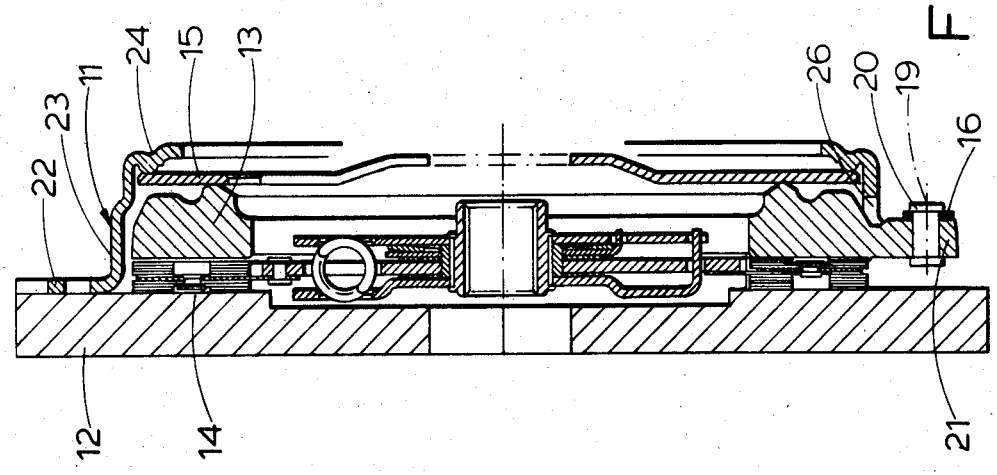
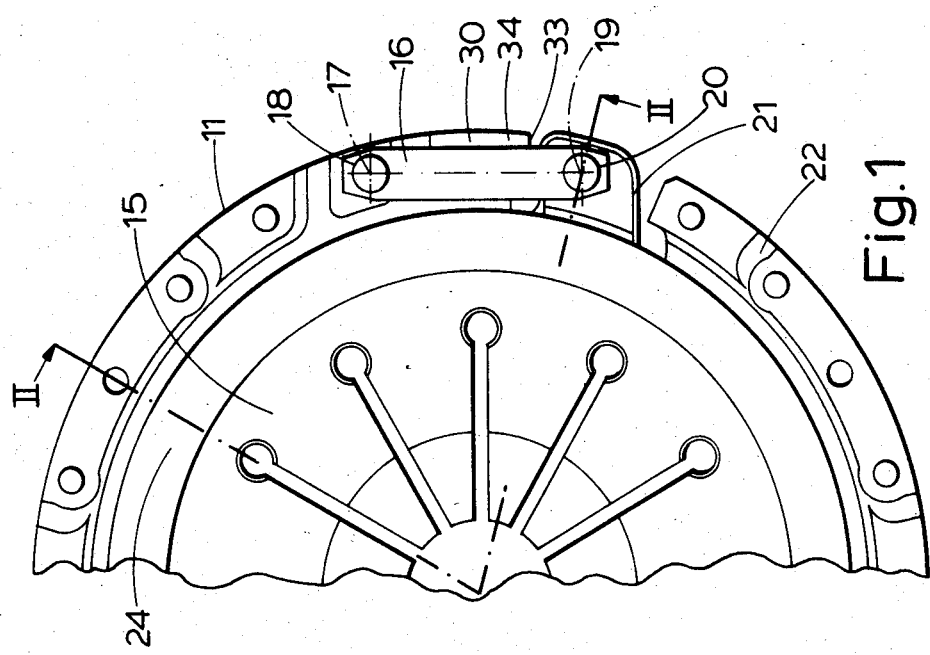

FRICTION CLUTCH COVER ASSEMBLIES

This invention relates to a friction clutch cover assembly of the kind including a cover for fastening to a reaction plate or flywheel and a pressure plate for gripping a driven plate interposed between the reaction plate and the pressure plate, said pressure plate being attached to the cover by resilient straps which allow for a limited axial movement of the pressure plate relative to the cover and for the transfer of torque between the cover and the pressure plate, each strap extending substantially tangentially from an attachment position on the cover to an attachment position on the pressure plate.

A problem exists with this type of clutch in that the straps are stressed upon assembly in order to resiliently bias the pressure plate away from the driven plate. Any large axial movement beyond that to be expected during normal operation of the clutch will result in overstressing and permanent deformation of the straps. Such overstressing can occur during the transit of the cover assembly prior to assembly to the flywheel or reaction plate, especially if the unmounted cover assembly is dropped or roughly handled. A cover assembly so treated may not show any sign of damage but will result in clutch drag and high driven plate wear in service.

It has been shown in GB No. 1 578 450 that overstressing of the straps can be prevented by extending each strap at its trailing end to co-operate with a stop in the form of an edge of an adjacent aperture in the cover. This arrangement has the disadvantage that assembling the components of the cover assembly is more difficult and the aperture weakens the cover.

It is an object of this invention to provide a friction clutch cover assembly in which means prevent accidental overstressing of the straps without unduly weakening the cover.

According to the invention there is provided a friction clutch cover assembly of the kind referred to characterised in that the cover adjacent each flexible strap forms a respective abutment surface such that in the event of excessive movement of the pressure plate away from the cover a portion of each flexible strap between its respective positions of attachment will contact the adjacent respective abutment surface to limit said pressure plate movement.

In a preferred embodiment of the invention the flexible straps are attached to the pressure plate by lugs extending radially outwardly from the outer periphery of the pressure plate and are attached to the cover on an outer flange of the cover.

In one embodiment of the invention each lug extends through an aperture in the outer flange and the outer flange between the aperture and the respective first position of attachment being stepped to form a ledge substantially parallel to the outer flange.

In an alternative embodiment of the invention the outer flange between each respective aperture and its respective first position of attachment is inclined relative to the outer flange to lie substantially parallel to the respective adjacent strap.

The invention will now be described by way of example and with reference to the accompanying drawings of which:

FIG. 1 is a half plan view of a clutch cover assembly according to the invention;

FIG. 2 is a cross-section on the line II—II of FIG. 1;

Figure 3:
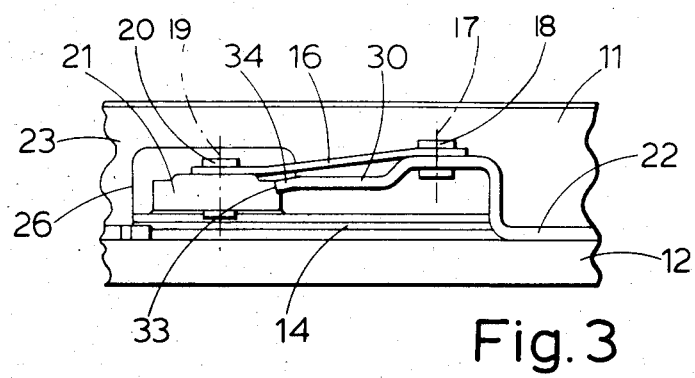
FIG. 3 is a view in the direction of arrow A on FIG. 1.

With reference to FIGS. 1 to 3 there is shown a clutch cover assembly including a cover 11 for fastening to a reaction plate in the form of a flywheel 12. A pressure plate 13, for gripping a driven plate 14 interposed between the pressure plate 13 and the flywheel 12, is biased away from the cover 11 by a diaphragm spring 15 and is attached to the cover 11 by three flexible straps 16.

The cover 11 is a steel pressing having an inner surface facing the flywheel 12 and an outer surface facing away from the flywheel and has in radial cross-section a radially outer flange 22 for fixing to the flywheel 12, and a substantially cylindrical wall portion 23 joining the outer flange 22 to a radially inner rim 24.

The cylindrical wall portion 23 has three equispaced windows 26 each of which is provided to allow for the passage of a respective driving lug 21 attached to and extending from the outer periphery of the pressure plate 13. Each strap 16 extends substantially tangentially from a respective first position of attachment 17 on a raised portion of the outer flange 22 where it is secured to the outer surface by a rivet 18, to a respective second position of attachment 19 on the pressure plate 13 where it is secured by another rivet 20 to one of the driving lugs 21. The straps 16 allow for a limited axial movement of the pressure plate 13 while permitting the transfer of torque between the cover 11 and the pressure plate 13. Radially outwardly of each of the windows 26 in the cylindrical wall 23 are a corresponding number of gaps 33 in the flange 22 and each of the three driving lugs 23 extends through its respective window 23 and is positioned in its respective gap. The outer flange 22 between each respective gap 33 and its respective first position of attachment 17 is stepped away from the adjacent strap 16 to form a ledge 30.

The ledges 30 are substantially parallel to the outer flange 22 and all have a respective abutment surface 34 formed by a portion of the respective ledge 30 adjacent to the respective gap 33. Each abutment surface 34 being inclined relative to the outer flange 22 to lie substantially parallel to the respective strap 16 when the strap contacts the abutment surface 34.

In the event of excessive movement of the pressure plate 13 away from the cover 11 a portion of each strap 16 between its respective positions of attachment 17,19 will contact its respective abutment surface 34 to limit said pressure plate 13 movement.

This prevents the straps 16 from being deflected beyond their elastic limit, which would result in permanent deformation occurring. Such deformation would reduce the ability of the straps 16 to provide sufficient clearance between the pressure plate 13 and the driven plate 14 when the clutch assembly is disengaged.

Figure 4:
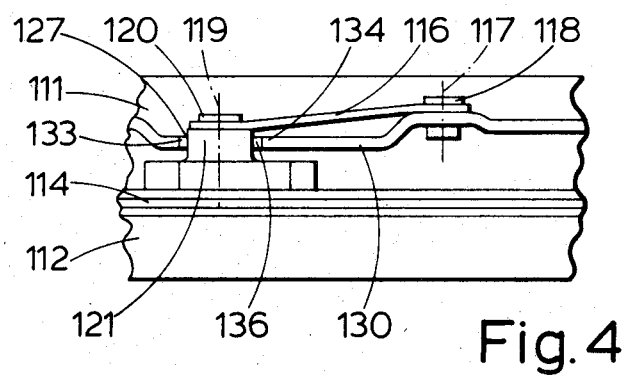
FIG. 4 is a view similar to that of FIG. 3 showing a first modification.

In the first modification of the invention shown in FIG. 4 parts similar to those described with respect to FIGS. 1-3 have the same reference numerals with the addition of 100.

Each lug 121 has a cylindrical portion 127 on which the respective strap 116 is fastened by the rivet 120. An edge 136 of each gap 133 forms the abutment surface 134 against which the respective strap 116 may react to limit excessive movement of the pressure plate 113 away from the cover 111.

Figure 5:
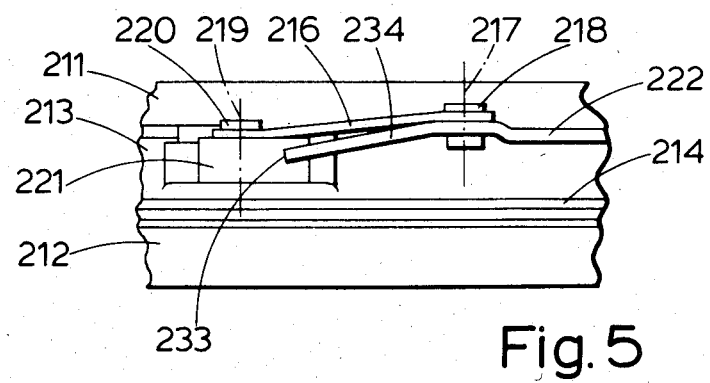
FIG. 5 is a view similar to that of FIG. 3 showing a second modification.

In the second modification of the invention shown in FIG. 5 parts similar to those described with respect to FIGS. 1-3 have the same reference numerals with the addition of 200.

The outer flange 222 between each respective gap 233 and its respective first position of attachment 217 being inclined relative to the outer flange 222 to form the respective abutment surface 234. Each abutment surface 234 being so inclined to lie substantially parallel to the respective adjacent strap 216 when said strap 216 contacts the abutment surface 234.

Although the friction clutch cover as specifically described herein has three single straps driveably connecting the pressure plate to the cover it is envisaged that the number of driving connections could be increased for heavy duty or larger clutch assemblies and that more than one strap may be used between the pressure plate and the cover at any one position.

What I claim as my invention and desire to secure by Letters Patent in the United States is:

1. A friction clutch cover assembly comprising:
a cover having inner and outer surfaces;
first positions of attachment on the cover;
a pressure plate;
second positions of attachment on the pressure plate;
flexible straps, each of which extends substantially tangentially from a respective one of said first positions of attachment to a respective one of said second positions of attachment, said straps allowing a limited axial movement of the pressure plate relative to the cover and providing for the transfer of torque between the cover and the pressure plate;
a diaphragm spring acting against the pressure plate to bias it away from the cover;
and abutment surfaces on the cover, each being adjacent to a respective flexible strap and disposed intermediate the first and second positions of attachment of said strap, and said abutment surfaces being so positioned that in the event of excessive pressure plate movement away from the cover each strap will intermediate its respective first and second positions of attachment abut its respective abutment surface to limit said movement.

2. A cover assembly as claimed in claim 1 in which there are radially outwardly extending lugs around the outer periphery of the pressure plate each of which has a respective one of said second positions of attachment thereon.

3. A cover assembly as claimed in claim 1 in which the cover has an outer flange upon which said first positions of attachment are located.

4. A cover assembly as claimed in claim 2 in which the cover has an outer flange upon which said first positions of attachment are located.

5. A cover assembly as claimed in claim 3 in which there is a ledge in the outer flange between the positions of attachment, the ledge defining an aperture through which one respective lug extends, the outer flange between the aperture and the respective first position of attachment being stepped to form the ledge.

6. A cover assembly as claimed in claim 4 in which there is a ledge in the outer flange between the positions of attachment, the ledge defining an aperture through which one respective lug extends, the outer flange between the aperture and the respective first position of attachment being stepped to form the ledge.

7. A cover assembly as claimed in claim 5 in which a portion of the ledge adjacent to the aperture forms the abutment surface.

8. A cover assembly as claimed in claim 6 in which a portion of the ledge adjacent to the aperture forms the abutment surface.

9. A cover assembly as claimed in claim 3 in which the abutment surface is inclined relative to the outer flange to lie substantially parallel to the respective adjacent strap when the strap is deflected to contact the abutment surface.

10. A cover assembly as claimed in claim 4 in which the abutment surface is inclined relative to the outer flange to lie substantially parallel to the respective adjacent strap when the strap is deflected to contact the abutment surface.

* * * * *